US008940401B2

(12) United States Patent
Felice et al.

(10) Patent No.: US 8,940,401 B2
(45) Date of Patent: Jan. 27, 2015

(54) CLEAR COATINGS ACRYLIC COATINGS

(75) Inventors: Kristopher M. Felice, Wolverine Lake, MI (US); Adam W. Emerson, Belleville, MI (US)

(73) Assignee: Resinate Technologies, Inc., Plymouth, MI (US)

( * ) Notice: Subject to any disclaimer, the term of this patent is extended or adjusted under 35 U.S.C. 154(b) by 179 days.

(21) Appl. No.: 13/492,906

(22) Filed: Jun. 10, 2012

(65) Prior Publication Data

US 2013/0144004 A1    Jun. 6, 2013

Related U.S. Application Data

(60) Provisional application No. 61/495,736, filed on Jun. 10, 2011.

(51) Int. Cl.
| | | |
|---|---|---|
| B32B 27/10 | (2006.01) | |
| C09D 133/10 | (2006.01) | |
| C09D 4/00 | (2006.01) | |
| C09D 5/16 | (2006.01) | |
| C09D 133/04 | (2006.01) | |
| C09D 133/00 | (2006.01) | |

(52) U.S. Cl.
CPC ............. C09D 133/10 (2013.01); C09D 4/00 (2013.01); C09D 5/1668 (2013.01); C09D 133/04 (2013.01); C09D 133/00 (2013.01)
USPC ........... 428/481; 428/482; 428/483; 428/500; 428/522

(58) Field of Classification Search
CPC .. C09D 133/00; C09D 133/04; C09D 133/10; C09D 4/00; C09D 5/1668
USPC .......................... 428/481, 482, 483, 500, 522
See application file for complete search history.

(56) References Cited

U.S. PATENT DOCUMENTS

| | | | |
|---|---|---|---|
| 1,883,182 | A | 10/1932 | Webel |
| 2,335,813 | A | 11/1943 | Stein |
| 2,465,319 | A | 3/1949 | Whinfield et al. |
| 2,862,957 | A | 12/1958 | Siggel et al. |
| 2,901,505 | A | 8/1959 | Kolb |
| 2,932,662 | A | 4/1960 | Ringwald |
| 3,037,049 | A | 5/1962 | Vaitekunas et al. |
| 3,047,539 | A | 7/1962 | Pengilly |
| 3,257,335 | A | 6/1966 | Whitfield et al. |
| 3,305,495 | A | 2/1967 | Orde |
| 3,321,510 | A | 5/1967 | Lotz et al. |
| 3,377,519 | A | 4/1968 | Strong et al. |
| 3,403,115 | A | 9/1968 | Gruschke et al. |
| 3,501,420 | A | 3/1970 | Stevenson |
| 3,544,622 | A | 12/1970 | England et al. |
| 3,565,852 | A | 2/1971 | Conix et al. |
| 3,639,448 | A | 2/1972 | Matsuzawa et al. |
| 3,652,649 | A | 3/1972 | Woo et al. |
| 3,801,273 | A | 4/1974 | Mays et al. |
| 3,830,759 | A | 8/1974 | Barkey |
| 3,835,081 | A | 9/1974 | Remley |
| 3,857,817 | A | 12/1974 | Henshaw et al. |
| 3,884,850 | A | 5/1975 | Ostrowski |
| 3,907,868 | A | 9/1975 | Currie et al. |
| 3,956,088 | A | 5/1976 | Fassell et al. |
| 4,049,736 | A | 9/1977 | Lamson et al. |
| 4,078,143 | A | 3/1978 | Malik et al. |
| 4,204,070 | A | 5/1980 | Suzuki et al. |
| 4,284,700 | A | 8/1981 | Oguchi et al. |
| 4,394,430 | A | 7/1983 | Jadwin et al. |
| 4,439,549 | A | 3/1984 | Brennan |
| 4,485,196 | A | 11/1984 | Speranza et al. |
| 4,521,556 | A | 6/1985 | Adams |
| 4,540,768 | A | 9/1985 | Speranza et al. |
| 4,542,239 | A | 9/1985 | Lamparter et al. |
| 4,568,717 | A | 2/1986 | Speranza et al. |
| 4,609,680 | A | 9/1986 | Fujita et al. |
| 4,701,480 | A | 10/1987 | Markusch et al. |
| 4,714,738 | A | 12/1987 | Chang et al. |
| 4,808,663 | A | 2/1989 | Chang et al. |
| 5,045,122 | A | 9/1991 | Tindall et al. |
| 5,223,544 | A | 6/1993 | Burkett et al. |
| 5,252,615 | A | 10/1993 | Rao et al. |
| 5,319,008 | A | 6/1994 | Janoski |
| 5,328,982 | A | 7/1994 | Tindall et al. |
| 5,371,112 | A | 12/1994 | Sayre et al. |
| 5,413,681 | A | 5/1995 | Tustin et al. |
| 5,414,107 | A | 5/1995 | Smith |
| 5,451,611 | A | 9/1995 | Chilukuri et al. |

(Continued)

FOREIGN PATENT DOCUMENTS

| | | |
|---|---|---|
| CN | 1231316 | 10/1999 |
| EP | 70684 | 1/1983 |

(Continued)

OTHER PUBLICATIONS

Achilias, Dimitris S., Glycolytic Depolymerization of PET Waste in a Microwave Reactor, Journal of Applied Polymer Science, vol. 118, pp. 3066-3073, 2020 Wiley Periodicals, Inc., 2010., Published on Wiley InterScience (www.interscience.wiley.com), DOI 10.1002/app.3737, Jun. 1, 2010.
ASTM International, D3359-09, Standard Test Methods for Measuring Adhesion by Tape Test, Standard excerpt, West Conshohocken, PA, 2009.
ASTM International, D4274-99, Standard Test Methods for Testing Polyurethane Raw Materials: Determination of Hydroxyl Number of Polyols, Standard excerpt, West Conshohocken, PA, 1999.
ASTM International, F1351-96 (Reapproved 2008), Standard Practice for Determination of the Effect of Hard Creasing Paper on Images Produced by Business Imaging Systems, Standard excerpt, West Conshohocken, PA, 1996.
Athawale et al., Waterborne PUR-dispersions, European Coatings Journal, vol. 45, 2002.
Baker, D. R. A. et al., Chemical Recycling of PET Waste from Soft Drink Bottles to Produce a Thermosetting Polyester Resin, Malaysian Journal of Chemistry, vol. 8, Issue 1, pp. 22-26, 2006.

(Continued)

Primary Examiner — Peter D Mulcahy
(74) Attorney, Agent, or Firm — Dunlap Codding P.C.

(57) ABSTRACT

The presently disclosed and claimed inventive concept(s) relates generally to liquid-based coatings for writable-erasable surfaces, products that include such coatings, and methods for making and using the same.

6 Claims, No Drawings

(56) References Cited

U.S. PATENT DOCUMENTS

| | | |
|---|---|---|
| 5,532,404 A | 7/1996 | Gallagher |
| 5,559,159 A | 9/1996 | Sublett et al. |
| 5,614,161 A | 3/1997 | Wilkens et al. |
| 5,635,584 A | 6/1997 | Ekart et al. |
| 5,710,315 A | 1/1998 | Gallagher |
| 5,726,277 A | 3/1998 | Salsman |
| 5,750,776 A | 5/1998 | Harvie |
| 5,792,887 A | 8/1998 | Korn et al. |
| 5,820,982 A | 10/1998 | Salsman |
| 5,858,551 A | 1/1999 | Salsman |
| 5,874,630 A | 2/1999 | Cook et al. |
| 5,877,255 A | 3/1999 | Gerber et al. |
| 5,882,674 A | 3/1999 | Herrmann et al. |
| 5,898,058 A | 4/1999 | Nichols et al. |
| 5,898,059 A | 4/1999 | Trojan |
| 6,046,295 A | 4/2000 | Frisch, Jr. et al. |
| 6,075,163 A | 6/2000 | Roh et al. |
| 6,166,264 A | 12/2000 | Ishii et al. |
| 6,255,547 B1 | 7/2001 | Smuda |
| 6,410,607 B1 | 6/2002 | Ekart et al. |
| 6,444,862 B1 | 9/2002 | Burkhardt et al. |
| 6,486,357 B2 | 11/2002 | Suib et al. |
| 6,566,525 B1 | 5/2003 | Kim et al. |
| 6,576,702 B2 | 6/2003 | Anderle et al. |
| 6,580,005 B1 | 6/2003 | Yazaki et al. |
| 6,649,792 B2 | 11/2003 | Sirek et al. |
| 6,652,971 B1 * | 11/2003 | Delmotte et al. ............ 428/413 |
| 6,706,843 B1 | 3/2004 | Ishihara et al. |
| 6,713,599 B1 | 3/2004 | Hinz et al. |
| 6,720,448 B2 | 4/2004 | Broccatelli |
| 6,723,873 B1 | 4/2004 | Murdoch |
| 6,767,485 B1 | 7/2004 | Steiner |
| 6,770,680 B2 | 8/2004 | Klenk |
| 6,780,962 B2 | 8/2004 | Moya et al. |
| 6,887,909 B2 | 5/2005 | Kawamura et al. |
| 6,911,546 B2 | 6/2005 | Hedrick et al. |
| 6,916,936 B2 | 7/2005 | Hedrick et al. |
| 6,919,383 B2 | 7/2005 | Khan et al. |
| 7,053,221 B2 | 5/2006 | Hedrick et al. |
| 7,095,974 B2 | 8/2006 | Yoshino et al. |
| 7,098,299 B1 | 8/2006 | Gutierrez et al. |
| 7,129,278 B2 | 10/2006 | Kayima et al. |
| 7,132,383 B2 | 11/2006 | Nakajima et al. |
| 7,157,139 B2 | 1/2007 | Salsman et al. |
| 7,169,954 B2 | 1/2007 | Mizuno et al. |
| 7,173,150 B2 | 2/2007 | Yazaki et al. |
| 7,192,988 B2 | 3/2007 | Smith et al. |
| 7,235,622 B2 | 6/2007 | Inada et al. |
| 7,297,721 B2 | 11/2007 | Kulkarni |
| 7,301,045 B2 | 11/2007 | Ishihara et al. |
| 7,338,981 B2 | 3/2008 | Gutierrez et al. |
| 7,544,800 B2 | 6/2009 | Hedrick et al. |
| 7,709,067 B2 | 5/2010 | Takagi et al. |
| 7,754,809 B2 | 7/2010 | Stollmaier et al. |
| 7,795,320 B2 | 9/2010 | Determan et al. |
| 7,799,836 B2 | 9/2010 | Agarwal et al. |
| 7,820,756 B2 | 10/2010 | Tammaji et al. |
| 7,842,373 B2 | 11/2010 | Halahmi et al. |
| 7,893,122 B2 | 2/2011 | Fregoso-Infante et al. |
| 7,897,651 B2 | 3/2011 | Ikenaga |
| 7,902,263 B2 | 3/2011 | Agarwal et al. |
| 7,902,264 B2 | 3/2011 | Determan et al. |
| 7,910,657 B2 | 3/2011 | Cohoon-Brister |
| 7,923,506 B2 | 4/2011 | Cohoon et al. |
| 7,928,150 B2 | 4/2011 | Kannan et al. |
| 8,096,119 B2 | 1/2012 | Baughman et al. |
| 8,362,142 B2 | 1/2013 | Stollmaier et al. |
| 2002/0077449 A1 | 6/2002 | Nichols et al. |
| 2004/0102533 A1 | 5/2004 | Durand et al. |
| 2005/0043560 A1 | 2/2005 | Manea et al. |
| 2005/0096482 A1 | 5/2005 | Tamada et al. |
| 2006/0251896 A1 | 11/2006 | Ferencz et al. |
| 2006/0287408 A1 * | 12/2006 | Baikerikar et al. ............ 522/71 |
| 2007/0117922 A1 | 5/2007 | Kayima et al. |
| 2007/0208133 A1 | 9/2007 | Stollimaier et al. |
| 2007/0299150 A1 | 12/2007 | Nakao et al. |
| 2008/0214699 A1 | 9/2008 | Halahmi et al. |
| 2008/0236443 A1 | 10/2008 | Salsman |
| 2008/0269509 A1 | 10/2008 | Hida et al. |
| 2008/0319236 A1 | 12/2008 | McNeff et al. |
| 2009/0012202 A1 | 1/2009 | Jacobine et al. |
| 2009/0122260 A1 | 5/2009 | Salamone et al. |
| 2009/0148603 A1 | 6/2009 | Goscha et al. |
| 2009/0318579 A1 | 12/2009 | Ikenaga |
| 2010/0092671 A1 | 4/2010 | Goscha et al. |
| 2010/0160586 A1 | 6/2010 | Koglin et al. |
| 2010/0273939 A1 | 10/2010 | Stollmaier et al. |
| 2010/0280277 A1 | 11/2010 | King et al. |
| 2011/0070413 A1 | 3/2011 | Lausch et al. |
| 2011/0086217 A1 | 4/2011 | Crain et al. |
| 2011/0098519 A1 | 4/2011 | Ramesh et al. |
| 2011/0124889 A1 | 5/2011 | Saladino et al. |
| 2011/0180509 A1 | 7/2011 | Hutchinson et al. |
| 2011/0200827 A1 | 8/2011 | Hutchinson et al. |
| 2011/0244172 A1 | 10/2011 | Wright et al. |
| 2011/0244231 A1 | 10/2011 | Erdogen-Haug et al. |
| 2012/0149791 A1 | 6/2012 | Felice et al. |
| 2012/0190800 A1 | 7/2012 | Felice et al. |
| 2012/0259061 A1 | 10/2012 | Felice et al. |

FOREIGN PATENT DOCUMENTS

| | | |
|---|---|---|
| IN | 160579 | 7/1987 |
| IN | 182728 | 7/1999 |
| IN | 187914 | 7/2002 |
| IN | 188894 | 11/2002 |
| IN | 189146 | 12/2002 |
| IN | 2005MU00989 | 6/2007 |
| IN | 2006MU00563 | 12/2007 |
| JP | 53 011951 | 2/1978 |
| JP | 02088627 | 3/1990 |
| JP | 05339330 | 12/1993 |
| JP | 06-212117 | 8/1994 |
| JP | 08-209069 | 8/1996 |
| JP | 09-011406 | 1/1997 |
| JP | 10036717 | 2/1998 |
| JP | 10-316903 | 12/1998 |
| JP | 11-209650 | 8/1999 |
| JP | 11286631 | 10/1999 |
| JP | 2000-034440 | 2/2000 |
| JP | 2000-44689 | 2/2000 |
| JP | 2000063702 | 2/2000 |
| JP | 2000256615 | 9/2000 |
| JP | 2001-040075 | 2/2001 |
| JP | 2001059012 | 3/2001 |
| JP | 2001288447 | 10/2001 |
| JP | 2002226778 | 8/2002 |
| JP | 2002226782 | 8/2002 |
| JP | 2002285391 | 10/2002 |
| JP | 2002285393 | 10/2002 |
| JP | 2003-034771 | 2/2003 |
| JP | 2004131456 | 4/2004 |
| JP | 2005105082 | 4/2005 |
| JP | 2006083305 | 3/2006 |
| JP | 2006328199 | 12/2006 |
| JP | 2008229406 | 10/2008 |
| JP | 2010214627 | 9/2010 |
| JP | 2011184627 | 9/2011 |
| KR | 10-2000-0021808 | 4/2000 |
| KR | 10-2001-0058978 | 7/2001 |
| KR | 2004076434 | 9/2004 |
| KR | 10-0808208 | 2/2008 |
| KR | 10-2004-0085581 | 3/2008 |
| KR | 10-2009-0062947 | 6/2009 |
| KR | 2009107837 | 10/2009 |
| KR | 10-2010-0082734 | 7/2010 |
| WO | WO/00/57998 | 10/2000 |
| WO | WO/01/92612 | 12/2001 |
| WO | WO/2005/062721 | 7/2005 |
| WO | WO/2007/032127 | 3/2007 |
| WO | WO/2007/052291 | 5/2007 |
| WO | WO/2007/052292 | 5/2007 |
| WO | WO/2007/075373 | 7/2007 |
| WO | WO/2007/116416 | 10/2007 |

(56) References Cited

FOREIGN PATENT DOCUMENTS

| | | |
|---|---|---|
| WO | WO/2008/090566 | 7/2008 |
| WO | WO/2008/104999 | 9/2008 |
| WO | WO/2008/105000 | 9/2008 |
| WO | WO/2009/005835 | 1/2009 |
| WO | WO/2009/085587 | 7/2009 |
| WO | WO/2010/091797 | 8/2010 |
| WO | WO/2011/058130 | 5/2011 |
| WO | WO/2011/100375 | 8/2011 |
| WO | WO/2011/126742 | 10/2011 |
| WO | WO/2011/100375 | 11/2011 |
| WO | WO/2012/047360 | 3/2012 |
| WO | WO/2012/047360 | 4/2012 |
| WO | WO/2012/115984 | 8/2012 |
| WO | WO/2012/115984 | 9/2012 |
| WO | WO/2012/170978 | 12/2012 |
| WO | WO/2014/093991 | 6/2014 |
| WO | WO/2014/093995 | 6/2014 |

OTHER PUBLICATIONS

Baliga, Satish et al., Depolymerization of Poly(Ethylene Terephthalate) Recycled from Post-Consumer Soft-Drink Bottles, Journal of Polymer Science: Part A: Polymer Chemistry, vol. 27, pp. 2071-2082, John Wiley and Sons, Inc., Newark New Jersey, USA, 1989.

Bartha, Emeric et a., Glycolysis of PET Wastes with Isosorbide Identification and Characterization of Hydroxy Oligoesters, Rev. Chim. (Bucharest), www.revistadechimie.ro, vol. 62, No. 4, pp. 401-408, 2011.

Billiau-Loreau, M. et al., Structural effects of diacidic and glycolic moieties on physicochemical properties of aromatic polyesterdiols from glycolysis/esterification of poly(ethylene terephthalate) wastes, Polymer 44, www.elsevier.com/locate/polymer vol. 43, pp. 21-28, 2002.

Campanelli, John R., The kinetics of hydrolysis and glycolysis of poly(ethylene terephthalate) melts at high temperatures, Department of Chemical Engineering, McGill University, Montreal, Jun. 1993.

Cata, A. et al., Preliminary Studies about PET Degradation. Rheological Determinations on Glycolysis Products Obtained with Propoylene Glycol, Chem. Bull. "Politehnica" University (Timisoara), vol. 52, Issue 66, pp. 1-2, 2007.

Chen, Cheng-Ho et al., Studies of Glycolysis of Poly(ethylene terephthalate) Recycled from Postconsumer Soft-Drink Bottles. I. Influences of Glycolysis Conditions, Journal of Applied Polymer Science, vol. 80, pp. 943-948, John Wiley & Sons, Inc., 2001.

Cimecioglu, A. L. et al., Properties of Oligomers Present in Poly(ethylene Terephthalate), Journal of Applied Polymer Science, vol. 32, pp. 4719-4733, John Wiley & Sons, Inc., 2003.

Erdogan-Haug, B. et al., Crosslinkable syrup solute copolymers with aminoalkyl (meth)acryloyl solvent monomers, pressure-sensitive adhesive and pressure-sensitive adhesive articles, SciFinder, pp. 1-13, 2012.

Garcia-Pacios et al., Affect of polydispersity on the properties of waterborne polyurethane dispersions based on polycarbonate polyol, International Journal of Adhesion & Adhesives, vol. 30, Issue 6, pp. 456-465, 2010.

Ghadage, R. S., Thermotropic Mesomorphic Polyesters. I. Copolyesters of Terephthalic Acid, Hydroquinone, and Flexible Diols, Polymer Science and Engineering Group, Division of Chemical Engineering, National Chemical laboratory, Pune 411 008, India, Journal of Applied Polymer Science, vol. 37, Issue 4245, pp. 1579-1588, 1989.

Ghaemy, Mousa et al., Unsaturated Polyester from Glycolized PET Recycled from Postconsumer Soft-Drink Bottles, Iranian Polymer Journal, vol. 11, No. 1, pp. 77-83, Apr. 30, 2007.

Gintis, D., Glycolytic Recycle of Poly(ethylene Terephthalate) (PET), Makromol. Chem., Macromol. Symp. vol. 57, pp. 185-190, 1992.

Grzebieniak, et al., Glycolysis of PET Waste and the Use of Glycolysis Products in the Synthesis of Degradable Co-Polyesters, Institute of Chemical Fibres, Poland, Fibres & Textiles in Eastern Europe, Issue 2, vol. 12, pp. 19-22, Apr./Jun. 2004.

Güclü, G. et al., Glycolysis of Poly(ethylene terephthalate) Wastes in Xylene, Journal of Applied Polymer Science, vol. 69, pp. 2311-2319, 1998.

Güclü, G. et al., Simultaneous glycolysis and hydrolysis of polyethylene terephthalate and characterization of products by differential scanning calorimetry, Engineering Faculty, Istanbul University, Istanbul, Turkey, Polymer 44, www.elsevier.com/locate/polymer, pp. 7609-7616, 2003.

Gurudatt, K. et al., A study on drying of textile substrates and a new concept for the enhancement of drying rate, SciFinder, Journal of the Textile Institute, vol. 101, Issue 7, pp. 635-644, 2010.

Hoydonckx, H. E. et al., Esterification and transesterification of renewable chemicals, Plenum Publishing Corporation, Topics in Catalysis, vol. 27, Nos. 1-4, pp. 83-96, 2004.

Ikladious, N.E., Recycling of Poly(Ethylene Terephthalate): Identification of Glycolysis Products, Journal of Elastomers and Plastics, vol. 32, pp. 140-151, Apr. 2000.

Jordi Labs, Polymer Solubility Index, Jordi Labs, Bellingham, MA, 8 pages.

Kao, C.Y. et al., Investigation of Catalytic Glycolysis of Polyethylene Terephthalate by Differential Scanning Calorimetry, Thermochimica Acta, vol. 292, pp. 95-103, 1997.

Kiesewetter et al., Organocatalysis: Opportunities and challenges for Polymer Synthesis, American Chemical Society, Macomolecules Perspective, vol. 43, pp. 2093-2107, 2010.

Li, R. "Single Polymer Composites Made of Slowly Crystallizing Polymers", A Dissertation Presented to the Academic Faculty, Georgia Institute of Technology, May 2009.

Limpiti T. et al., Mechanical Property Improvement of UPE Resin from Glycolyzed PET with Commercial UPE Resin, Journal of Metals, Materials and Minerals, vol. 19, No. 1, pp. 45-51, 2009.

Nasta, et al., Polyurethane dispersions, Tougher by design, New hydrophobic modifications of PUDs enhance performance, European Coatings Journal, www.european-coatings.com, 2011.

Nikles, D. et a., New Motivation for the Depolymerization Products Derived from Poly(Ethylene Terephthalate (PET) Waste: a Review, Macromolecular Materials and Engineering, www.mme-journal.de, vol. 290, Issue 1, pp. 13-30, 2005.

Pardal, F., Comparative Reactivity of Glycols in PET Glycolysis, Polymer Degradation and Stability, vol. 91, Issue 11, pp. 2567-2578, 2006.

Paszun, D. et al., Chemical Recycling of Poly(ethylene terephthalate), Polymer Institute, Technical University of Szczecin, Szczecin, Poland, Industrial & Engineering Chemistry Research, vol. 36, No. 4, pp. 1373-1383, 1997.

PCI Magazine, Troubleshooting Metal Catalyzed Urethane Systems, PCT, Paint & Coatings Industry, King Industries, Inc., Norwalk, CT, 2000.

Petrov et al., Depolymerization of Polyethylene Terephthalate Waste with Ethylene Glycol, Fibre Chemistry, Plenum Publishing Corporation, 1980.

Petrov et al., Faster Synthesis of Polyethylene Terephthalate, Fibre Chemistry, Plenum Publishing Corporation, 1976.

Petrov et al., Utilization of the Waste from the Production of Polyester Filament Yarn and Staple Fibre, Fibre Chemistry, Plenum Publishing Corporation, 1979.

Polk, M.B., Depolymerization and Recycling, in Synthetic Methods in Step-Growth Polymers (eds M.E. Rogers and T.E. Long), John Wiley & Sons, Inc., Hoboken, NJ, Chapter 10, ISBN 9780471387695, pp. 527-575, Apr. 2003.

Polk, M.B., Nylon 6, Nylon 66, and Pet Depolymerization, Georgia Tech, School of Textile and Fiber Engineering, vol. 542, Issued 1995.

Rogers, M. E. et al., Synthetic Methods in Step-Growth Polymers, John Wiley & Sons, Inc., Hoboken, New Jersey, 2003.

Rosthauser et al., Waterborne Polyurethanes, Journal of Industrial Textiles, SAGE Publications, http://jit.sagepub.com/content/16/1/39, vol. 16, Issue 39, pp. 39-79, Jul. 1986.

Saint-Loup, R., Synthesis of (polyethylene terephthalate/polyϵ-caprolactone) copolyesters, Polymer 44, www.elsevier.com/locate/polymer, vol. 44, Issue 12, pp. 3437-3449, 2003.

Saravari et al., Synthesis of Urethane oils from Palm Oil and Waste PET Bottles, Journal of Applied Polymer Science, vol. 105, pp. 1802-1807, 2007.

Shukla, S.R. et al., Glycolysis of Polyethylene Terephthalate Waste Fibers, Journal of Applied Polymer Science, Wiley InterScience (www.interscience.wiley.com), vol. 97, Issue 2, pp. 513-317, Nov. 19, 2004.

(56) References Cited

OTHER PUBLICATIONS

Sinha V. et al., Pet Waste Management by Chemical Recycling: a Review, Journal of Polymers and Environment, vol. 18, No. 1, pp. 8-25, Mar. 2010.
Smirnov et al., Transesterification of Dimethyl Terephthalate with Ethylene Glycol, Fibre Chemistry, Plenum Publishing Corporation, 1984.
Stevenson, R.W. et al., Polycondensation Rate of Poly(ethylene Terephthalate). I. Polycondensation Catalyzed by Antimony Trioxide in Presence of Reverse Reaction, Journal of Polymer Science, Part A-1, vol. 6, pp. 889-900, 1968.
Troev, K. et al., A Novel Catalyst for the Glycolysis of Poly(ethylene terephthalate), Journal of Applied Polymer Science, vol. 90, pp. 1148-1152, 2003.
USGAO, Opportunities to Reduce Corrosion Costs and Increase Readiness, Report to Congressional Committees, United States General Accounting Office, Washington D.C., Issue July, pp. 1-58, 2003.
Vaidya, U.R. et al., Polyester Polyols from Glycolyzed PET Waste: Effect of Glycol Type on Kinetics of Polyesterification, Journal of Applied Polymer Science, vol. 38, Issue 4323, pp. 1179-1190, 1989.
Vaidya, U.R. et al., Unsaturated Polyester Resins from Poly(ethylene terephthalate) Waste. 1. Synthesis and Characterization, Industrial & Engineering Chemistry Res., vol. 26, pp. 194-198, 1987.
Vaidya, U.R. et al., Unsaturated Polyester Resins from Poly(ethylene terephthalate) Waste. 2. Mechanical and Dynamic Mechanical Properties, Industrial & Engineering Chemistry Res., vol. 27, pp. 2056-2060, 1988.
Vakili, M.H., Chemical Recycling of Poly Ethylene Terephthalate Wastes, World Applied Sciences, Journal 8, Issue 7, pp. 839-846, 2010.
Vitkauskiene, I. et al., Glycolysis of industrial poly(ethylene terephthalate) waste directed to bis(hydroxyethylene) terephthalate and aromatic polyester polyols, Department of Polymer Chemistry, Vilnius University, CHEMIJA, vol. 19, Issue 2, pp. 29-34, 2008.
Wang, H. et al., Fe-containing magnetic ionic liquid as an effective catalyst for the glycolysis of poly(ethylene terephthalate), www.elsevier.com/locate/catcom, Catalysis Communications, vol. 11, Issue 8, pp. 763-767, 2010.
Werner Blank, Isocyanate Titration, Werner Blank, Jun. 2006.
International Search Report and Written Opinion dated Jan. 31, 2013; WO/2012/170978.
WO/2011/100375, International Search Report and Written Opinion, dated Nov. 30, 2011.
WO/2011/100375, International Preliminary Report on Patentability, dated Aug. 23, 2012.
WO/2012/047360, International Search Report and Written Opinion, dated Mar. 16, 2012.
WO/2012/047360, International Preliminary Report on Patentability; dated Apr. 18, 2013.
WO/2012/115984, International Search Report and Written Opinion, dated Sep. 28, 2012.
WO/2012/115984; International Preliminary Report on Patentability; dated Aug. 21, 2013.
Gurudatt, K. et al., "A study on drying of textile substrates and a new concept for the enhancement of drying rate", Journal of the Textile Institute, vol. 101, Issue 7, 2010, Abstract Only.
Davidson, et al., "Factors influencing the photoyellowing which occurs during the photoinitiated polymerization of acrylates", Pitture e Vernici Europe, vol. 72, Issue 4, 1996, pp. 42-46.
Dongre, R.N., "Phenol-crotonaldehyde resins. 1. Syntheseis andcharacterization of acid-catalyzed resins", Industrial & Engineering Chemistry Product Research and Development, vol. 24, Issue 4, 1985, Abstract Only.
Ghadage, R. S., "Thermotropic mesomorphic polyesters. I. Copolyesters of terphthalic acid, hydroquinone, and flexible diols", Journal of Applied Polymer Science, vol. 37, Issue 6, 1989, pp. 1579-1588, Abstract Only.
Granatstein et al., "Nonreinforcing filler-elastomer systems. I. Experiments based on model systems", Journal of Applied Polymer Science, vol. 18, Issue 1, 1974, pp. 1-20, Abstract Only.
Jog, J. P., "Structure development in powder processing of poly(phenylene sulfide)", Advances in Polymer Technology, vol. 11, Issue 1, 1992, pp. 41-52, Abstract Only.
Lan, et al., "Syntheseis and configuration of amphoteric polyurethane retanning filling agents PUR-A", Zhongguo Pige, vol. 31, Issue 3, 2002, p. 9-12, Abstract Only.
Li, Fusheng et al., "Preparation and characterization of ultraviolet-curable nanocomposite coatings initiated by benzophenone/n-methyl diethanolamine", Journal of Applied Polymer Science, vol. 96, Issue 3, 2005, pp. 912-918, Abstract Only.
Li, Min-ting, et al., "Preparation and in-situ FTIR detection of deblocked process for waterborne polyurethane crosslinking agent", Tanxingti, vol. 21, Issue 1, 2011, pp. 10-14, Abstract Only.
Nadkarni, V. M., "Emerging trends in polymer matrix composites", Defence Science Journal, vol. 43, Issue 4, 1993, pp. 351-364, Abstract Only.
Nadkarni, V. M., "Polymer alloys: science and practice", Proceedings—Indian Academy of Sciences, Chemical Sciences, vol. 92, Issue 6, 1983, pp. 623-637, Abstract Only.
Nadkarni, V. M., "On structure development and structure-property relationships in engineering plastics", Metals, Materials and Processes, vol. 3, Issue 3, 1991, pp. 197-208, Abstract Only.
Nadkarni, V. M., "Thermomechanical behavior of modified asphalts", Industrial & Engineering Chemistry Product Research and Development, vol. 24, Issue 3, 1985, Abstract Only.
Nadkarni, V. M., "Entensional flow induced crystallization in polyethylene melt spinning", Journal of Polymer Science, vol. 15, 1977, pp. 2151-2183.
Pandit, S., "Toughening of Unsaturated Polyesters by Reactive Liquid Polymers. 2. Processibility and Mechanical Properties", Industrial & Engineering Chemistry Research, vol. 33, Issue 11, 1994, Abstract Only.
Raval, et al., "Modified Karanja (*Pongamia pinnata*). Oil-based curing of acid functional acrylic copolymer resin for anticorrosive coating", Chemical Engineering World, vol. 40, Issue 10, 2005, pp. 65-70, Abstract Only.
Vaidya, E. R., "Unsaturated polyester resins and polyurethane elastomers and non-CFC rigid foams from polyethylene terephthalate) waste", Polymeric Materials Science and Engineering, vol. 63, 1990, pp. 1029-1033, Abstract Only.
Vaidya, E. R., "Unsaturated polyester resins from poly(ethylene terephthalate) waste. 1. Synthesis and characterization", Industrial & Engineering Chemistry Research, vol. 26, Issue 2, 1987, Abstract Only.
Vaidya, E. R., "Unsaturated polyester resins from poly(ethylene terephthalate) waste. 2. Mechanical and dynamic mechanical properties", Industrial & Engineering Chemistry Research, vol. 27, Issue 11, 1988, Abstract Only.
Varma, A. J., "Curing characteristics of epoxy resins filled with cellulose and oxidized cellulose", Angewandte Makromolekulare Chemie, vol. 122, 1984, pp. 211-218.
Varma, A. M., "Electrical surface conductivity of fluorinated polymer films after chemical surface treatment", Makromolekulare Chemie, Rapid Communications, vol. 4, Issue 11, 1983, pp. 715-719.
Yin, S. et al., "Temperature-dependence modeling of highly crosslinked polymer networks", Journal of Applied Polymer Science, vol. 88, Issue 10, 2003, p. 2416-2426, Abstract Only.
WO/2014/093991, International Search Report and Written Opinion, dated Apr. 15, 2014.
WO/2014/093995, International Search Report and Written Opinion, dated Apr. 15, 2014.
Lorenz et al., "Investigation of the Particle Surface of Anionic Polyurethane Dispersions with COO$^-$-Groups", Die Angewandte Makromelekulare Chemie, 1979, pp. 113-127, Issue 83.
Xiao et al., Advances in Urethane Ionomers, Technomic Publishing Company, Inc., pp. 59-61, 1995.

\* cited by examiner

CLEAR COATINGS ACRYLIC COATINGS

CROSS REFERENCE TO RELATED APPLICATION

The present application claims benefit under 35 U.S. 119 (e) of U.S. Provisional Patent Application Ser. No. 61/495,736, filed Jun. 10, 2011, the entire contents of which are hereby expressly incorporated herein by reference.

BACKGROUND OF THE INVENTION

1. Field of the Disclosed and/or Claimed Inventive Concepts

The presently disclosed and claimed inventive concept(s) relates generally to liquid-based coatings for writable-erasable surfaces, products that include such coatings, and methods for making and using the same.

2. Background

Dry erase boards are well known in the art. They are found in classrooms (replacing chalkboards) and in board rooms (often replacing flip charts). Smaller dry erase boards are used on doors, walls, and lockers, in homes, dormitories, restaurants, and various other places where people want to jot down notes. The user writes on the dry erase board with a dry erase marker and then simply wipes off the marking using a cloth or dry eraser.

Dry erase boards typically include a substrate, such as paper or board, and a coating, such as a lacquer coating, extending upon the substrate. The coating provides a writing surface that can be marked using dry erase marking pens. Dry erase marking pens, which are typically felt tip marking instruments, contain inks that not only can mark such surfaces, but also can be erased with minimal effort using, e.g., a dry eraser, cloth, or paper tissue.

The erasability of dry erase inks from the writing surfaces of dry erase boards can deteriorate over time, resulting in the formation of non-removable "ghost images." In addition, such surfaces can be incompatible with some dry erase markers, and can be permanently marked if inadvertently written on with a permanent marker.

Graffiti is a common problem encountered in areas of access to the general public for example, walls of a public restroom or portable restrooms or in a subway station. Moreover, generally, unwanted markings on surfaces can occur almost anywhere. Graffiti is often in the form of paint, such as spray paint, but graffiti and other markings may be applied by markers, crayons, and other writing fluids. As used herein, the term "graffiti" will be used to refer broadly to unwanted markings, whether consisting of paint, such other fluids or other unwanted markings, scuff marks and the like.

Such markings are particularly troublesome because they are often very difficult to remove from the surfaces on which they have been applied. Thus, painted surfaces often must be repainted to cover up the markings and sometimes must be even stripped and then repainted. For example, graffiti often is applied with paint similar to that on the surface. Removal of the graffiti paint by abrasion or with a solvent therefore is impractical because it typically results in removal of at least a portion of the underlying paint. Unpainted surfaces sometimes must be sandblasted to remove the markings.

Other solutions also include coating the surface of the article that would serve as a barrier to permit easy removal of such marking, or coating the surface that may be resistant to graffiti. However, such solutions are expensive and labor intensive. Additionally, not all surfaces can be coated with graffiti-resistant coating.

DESCRIPTION OF THE PRESENTLY DISCLOSED AND/OR CLAIMED INVENTIVE CONCEPT(S)

The presently claimed and disclosed inventive concept(s) provide coatings having writable-erasable surfaces, products that include such coatings and methods of making and using the same. Generally, the coatings having the writable-erasable surfaces are produced from a base composition optionally in a carrier and a coating curing agent under ambient conditions. When the writing surface is marked with a marking material, such as a water- or solvent-based marking material, the marking material can be erased to be substantially invisible with little or no ghosting, even after prolonged and repeated use. The coatings can be also used to cover commercial buildings so that graffiti can be easily removed.

The coatings have many desirable attributes, including low surface roughness and porosity. Generally, while not intending to be bound by any theory, it is believed that the low porosity of the coatings makes the coatings substantially impervious to the marking materials, while the low surface roughness prevents the marking materials from becoming entrapped on the surface beyond effective reach of an eraser.

In one aspect of the presently claimed and disclosed inventive concept(s), a coating product includes a cured coating (such as cross-linked) extending upon a substrate and having a writable-erasable surface. The coating is curable under ambient conditions, and can be formed from a base composition. A coating curing agent can be optionally used in the curing process. The base composition can be produced by reacting a hydroxyl-containing acrylic resin, an alcohol, a silane compound, water, and an acid catalyst.

The above hydroxyl-containing acrylic resin can be obtained by copolymerizing a hydroxyl-containing acrylic monomer with another ethylenically unsaturated group-containing monomer by a conventional method. The above hydroxyl-containing acrylic monomer is not particularly restricted but includes, among others, hydroxyalkyl (meth)acrylates such as 2-hydroxyethyl (meth)acrylate, 2-hydroxypropyl (meth)acrylate and 4-hydroxybutyl (meth)acrylate; Placcel FM1 (2-hydroxyethyl (meth)acrylate-caprolactone adduct, product of Daicel Chemical Industries); polyalkylene glycol mono (meth)acrylates and the like. These may be used singly or two or more of them may be used in combination. In the present specification, "(meth)acrylate" means "acrylate and/or methacrylate".

The above-mentioned other ethylenically unsaturated group-containing monomer is not particularly restricted but includes, among others, alkyl (meth)acrylates such as methyl (meth)acrylate, ethyl (meth)acrylate, n-propyl (meth)acrylate, isopropyl (meth)acrylate, n-butyl (meth)acrylate, i-butyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate and lauryl (meth)acrylate; aromatic vinyl monomers such as styrene and vinyltoluene; epoxy-containing monomers such as glycidyl (meth)acrylate; amino-containing monomers such as dimethylaminoethyl (meth)acrylate and diethylaminoethyl (meth)acrylate; acrylamide monomers such as (meth)acrylamide, N-ethyl (meth)acrylamide, N,N-butoxymethyl(meth)acrylamide and N-methylacrylamide; acrylonitrile, vinyl acetate, acrylic acid, methacrylic acid, etc. These may be used singly or two or more of them may be used in combination.

In one embodiment, the alcohol can be any low molecular weight alcohols, including but not limited to methanol, ethanol, 1-propanol, 2-propanol, butanol and isobutanol, alone or in combination.

The silane compound can be represented by chemical formula (I):

$$R_nSi(OR')_{4-n} \quad (I)$$

wherein each R and R' independently represent a hydrocarbon group, and n is 0≤n≤4. The silane compound is selected from the group consisting of tetramethoxysilane, tetraethoxysilane (TEOS), tetrapropoxysilane, tetrabutoxysilane, tetraacetoxysilane, γ-glycidoxypropyltrimethoxysilane, methyltrimethoxysilane, methyltriethoxysilane, ethyltrimethoxysilane, ethyltriethoxysilane, phenyltrimethoxysilane, phenyltriethoxysilane, γ-glycidoxypropylmethyldiethoxysilane, vinyltrimethoxysilane, n-propyltriethoxysilane, decyltrimethoxysilane, decyltriethoxysilane, gamma-chloropropyltrimethoxysilane, ethyltriethoxysilane, vinyltriethoxysilane, t-butyltriethoxysilane, n-butyltriethoxysilane, iso-butyltriethoxysilane, iso-butyltrimethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, octyltriethoxysilane, methyltriallyloxysilane, dimethyldimethoxysilane, dimethyldiethoxysilane, diisopropyldimethoxysilane, diisobutyldimethoxysilane, methylethyldiethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis(o-tolyl)dimethoxysilane, bis(m-tolyl)dimethoxysilane, bis(p-tolyl)dimethoxysilane, bis(p-tolyl)diethoxysilane, dicyclohexyldimethoxysilane, cyclohexylmethyldimethoxysilane, cyclohexylmethyldiethoxysilane, 2-norbornanemethyldimethoxysilane, tetrakis(2-methoxyethoxy)silane, trimethylmethoxysilane, trimethylethoxysilane, trimethylphenoxysilane, and combinations thereof.

In one embodiment, a metal alkoxide can be used to form a base composition without silane compounds. In another embodiment, a metal alkoxide can be used in addition to silane compounds. One example of a metal alkoxide is tetraisopropyl titanate.

The acid catalyst can be either mineral acids or low molecular weight organic acids. In one embodiment, the acid catalyst can be hydrochloric acid, sulfuric acid, nitric acid, or phosphoric acid. In another embodiment, the acid catalyst can be formic acid, acetic acid or propionic acid; or functionalized version of these.

A base composition can be prepared as follows:

Add a hydroxyl-containing acrylic resin, an alcohol and an acid catalyst into a container and stir to form a mixture. The mixture may be heated to about 20 to about 90 degrees Celsius until the resin is completely solubilized in the alcohol. In one embodiment, the mixture can be heated to about 30 to about 70 degrees Celsius. Add a silane compound to the mixture and heat the container to about 65° C.+/−5° C. Add water containing the acid catalyst into the container to form a final mixture. Reflux the final mixture for about one hour and then cool the final mixture to room temperature to form the base composition.

The coating can be formed from the base composition optionally with a coating cure agent in a carrier. The carrier can be a water-based solvent, a non-water based solvent and combinations thereof. While not intending to be bound by theory, it is believed that solvents can be effective as a dispersive vehicle for the resins in a coating formulation prior to curing. During the application of the formulation, they aid in achieving an appropriate viscosity of the formulation. The solvents can include, but are not limited to 2-butoxyethanol, ethylene glycol, diacetone alcohol, ethyl benzene, xylenes, methyl amyl ketone, isopropyl alcohol, propylene glycol monomethyl ether, ethylene glycol monobutyl ether, butanol, paraffins, alkanes, polypropylene glycol, Stoddard solvent, toluene, ethoxylated alkylphenol, 1-methyl-2-pyrrolidinone, or 1-ethylpyrrolidin-2-one.

The coating curing agent if used, is not particularly restricted but includes, among others, organotin compounds such as dibutyltin laurate, dibutyltin octoate and dibutyltin diacetate; and metal chelate compounds such as aluminum tris(acetylacetonate), titanium tetrakis(acetylacetonate), titanium bis(acetylacetonate), titanium bis(butoxy)-bis(acetylacetonate), titanium bis(isopropoxy)-bis(acetylacetonate), zirconium bis(butoxy)-bis(acetylacetonate) and zirconium bis(isopropoxy)-bis(acetylacetonate). These may be used singly or two or more of them may be used in combination. Among them, organotin compounds are generally used.

The coating curing agent can be sulfonic acids. Examples of sulfonic acids include, but not limited to, benzenesulfonic acid, para-toluenesulfonic acid, dodecylbenzenesulfonic acid, and naphthalenesulfonic acid.

Fillers such as colloidal silica can be added into the coating mixture of the base composition optionally with the coating curing agent. Colloidal silica refers to silica in a single- or multi-solvent dispersion and particularly effective in enhancing abrasion resistance of the coating. The silica may be small spherical particles about 1 nm to about 200 nm in diameter. In one embodiment, the small spherical particles may be about 10 nm to about 100 nm in diameter. Such nano-sized silica particles have refractive indices particularly suitable for clear coatings. They impose limited scattering or interference to light transmission. The silica particles can also have other shapes such as string-of-pearl particle shapes and elongated particle shapes. The solvent can be water for water-reducible coating systems. Suitable colloidal silica is either treated or surface-treated. The colloidal silica can be present in the coating mixture in an amount of about 0.01 to about 50 weight percent. In one embodiment, the colloidal silica can be present in the coating mixture in an amount of about 0.1 to about 2 weight percent.

A coating product includes a substrate and a cured coating extending upon the substrate. The coating has a writable-erasable surface. When the writable-erasable surface is marked with a marking material, the marking material can be erased from the writable-erasable surface to be substantially invisible, resulting in little or no ghosting, even after prolonged normal use.

The marking material can include a colorant (e.g., a pigment) and a solvent such as water, alcohol, alkoxy alcohol, ketone, ketonic alcohol, ester, mineral spirit, or mixtures thereof. The marking material can be selected from any of the industry standard dry-erase markers.

The materials that form the coating can be applied to many different types of substrates, including porous (e.g., paper) and non-porous substrates (e.g., densified ceramics). The substrate could be a flexible film or a rigid movable or immovable structure. Examples of the substrate include, but are not limited to, a polymeric material (such as polyester or polyamide), cellulosic material (such as paper), glass, wood, wall (such as plaster or painted), fiber board (such as a whiteboard in which the cured coating extends upon a fiber board), particle board (such as a chalkboard or blackboard), gypsum board, densified ceramics, stone (such as granite), and metal (such as aluminum or stainless steel). The substrate could be a newly built structure or even an old and worn out chalkboard, blackboard, or whiteboard. In some instances, the surface of the substrate can be cleaned by sanding the surface and priming the surface prior to application of the coating. In some instances, the surface can also be cleaned with a cleaning agent (e.g., a mild acid) in order to provide better adhesion of the coating to the surface.

The materials that form the coating, upon application to the substrates, typically cure under ambient conditions. Curing, here, refers to the process of setting of the materials that form the coating on the substrate. It could refer to the process of simple evaporation of the solvent from the materials that form the coating; the different methods of cross-linking among the materials that form the coating including, but not limited to, oxidative cross-linking and catalyzed polymerization. Cross-linking between polymeric chains, either chemical or physical, can influence certain unique properties of coatings. In some optional implementations, the cure could be facilitated by UV-light, thermal means, initiators, or electron-beam. The coating can cure under ambient conditions in from about 4 hours to about a week.

In general, the coating can be formed by applying, e.g., rolling, painting, or spraying, a solution of the material in a water-based carrier that can have a sufficient viscosity such that the applied coating does not run soon after it is applied or during its curing. At the same time, the solution viscosity should be sufficient to permit easy application.

Advantageously, when the writable-erasable surface is marked with a marking material that includes a colorant and a solvent that includes one or more of water, alcohols, alkoxy alcohols, ketones, ketonic alcohols, esters, acetates or mineral spirits, the marking material can be erased from the writable-erasable surface to be substantially invisible. Mixtures of any of the noted solvents may be used. For example, mixtures of two, three, four or more of the noted, or other, solvents may be used.

In some implementations, the marking material can be erased from the writable-erasable surface to be substantially invisible by wiping the marks with an eraser that includes a fibrous material. For example, the eraser can be in the form of a disposable wipe or a supported (e.g., wood, plastic) felt. The eraser can also include, e.g., one or more of water, alcohols, alkoxy alcohols, ketones, ketonic alcohols, esters, acetates or mineral spirits. Mixtures of any two or more of these solvents may also be used.

Examples of alcohols include ethanol, n-propanol, iso-propanol, n-butanol, iso-butanol, and benzyl alcohol. Mixtures of any two or more of these solvents also represent alcohols. Examples of alkoxy alcohols include 2-(n-propoxy) ethanol, 2-(n-butoxy)ethanol and 2-(n-propoxy)ethanol. Mixtures of any two or more of these solvents also represent alkoxy alcohols. Examples of ketones include acetone, methyl ethyl ketone and methyl n-butyl ketone. Mixtures of any two or more of these solvents may also be utilized. Examples of acetates include methyl acetate, ethyl acetate, n-butyl acetate and t-butyl acetate. Mixtures of any two or more of these solvents may also be utilized.

The following examples illustrate certain implementations of the presently disclosed and claimed inventive concept(s). These examples are not intended to limit the scope of the presently disclosed and claimed inventive concept(s).

EXAMPLES

Example 1

X90-1072-59-26

164 g of Formula No. 2 (20% IBMA/20% MMA/50% HEMA/10% BA), 200 g of reagent alcohol (about 90 wt % of ethanol, 3.5-5.5 wt % of methanol and 4-6 wt % of 2-propanol) and two drops of concentrated $H_2SO_4$ were charged into a 1000 mL, four-neck round bottom flask equipped with overhead mechanical stirrer, condenser, addition funnel, claisen take-off adapter and temperature probes to separately measure the temperature of the pot contents and the head space. The pot contents were heated to 30-70 degrees Celsius until the mixture was completely solubilized. A mixture of TEOS/Octyltriethoxysilane/Dimethyldimethoxysilane (396 g of TEOS, 25 g of octyltriethoxysilane and 1.2 g of dimethyldimethoxysilane) was added. The pot contents were then heated to 65° C.+/−5° C. and 64 g of $H_2O$ containing two drops of concentrated $H_2SO_4$ was added drop wise over a 1-2 hour period. The mixture was then refluxed for 1 hour, cooled to room temperature and filtered as necessary.

Example 2

X90-1072-27-18

45 g of Formula No. 1 (35% MMA/35% IBMA/30% HEMA/), 150 g of reagent alcohol, 0.52 g of propylene glycol (0.5 wt % based on the total silane weight) and one drop of concentrated $H_2SO_4$ were charged into a 500 mL, single-neck, round bottom flask equipped with magnetic stir bar, two claisen adapters, condenser, addition funnel, and temperature probes to measure temperature of the pot. The pot contents were heated to 30-70 degrees Celsius until the mixture was completely solubilized. TEOS/Dimethyldimethoxysilane mixture (103 g of TEOS and 0.7 g of dimethyldimethoxy silane) was added. The pot contents were then heated to 65° C.+/−5° C. and 16 g of $H_2O$ containing one drop of concentrated $H_2SO_4$ was added drop wise over a 1-2 hour period. The mixture was then refluxed for 1 hour. Approximately 50 g of aliquot was taken out and the remaining material in the pot was concentrated and diluted with acetone.

Example 3

X90-1072-31-19

102 g of Formula No. 1 (35% MMA/35% IBMA/30% HEMA), 200 g of reagent alcohol and two drops of concentrated $H_2SO_4$ were charged into a 1000 mL, four-neck round bottom flask equipped with overhead mechanical stirrer, condenser, additional funnel, claisen take-off adapter and temperature probes to measure temperature of the pot and head space. The pot contents were heated to 30-70 degrees Celsius until the mixture was completely solubilized. 417 g of TEOS was added. The pot contents were then heated to 65° C.+/−5° C. and 65 g of $H_2O$ containing two drops of concentrated $H_2SO_4$ was added drop wise over a 1-2 hour period. The mixture was then refluxed for 1 hour, cooled to room temperature, and filtered as necessary.

Example 4

X90-1072-36-21

102 g of Formula No. 2 (20% IBMA/20% MMA/50% HEMA/10% BA), 200 g of reagent alcohol and two drops of concentrated $H_2SO_4$ were charged into a 1000 mL, four-neck round bottom flask equipped with overhead mechanical stirrer, condenser, additional funnel, claisen take-off adapter and temperature probes to measure temperature of the pot and head space. The pot contents were heated to 30-70 degrees Celsius until the mixture was completely solubilized. TEOS/Isobutyltrimethoxy silane mixture (396 g of TEOS and 18 g of isobutyltrimethoxysilane) was added. The pot contents were then heated to 65° C.+/−5° C. and 64 g of $H_2O$ containing two drops of concentrated $H_2SO_4$ was added drop wise over a 1-2 hour period. The mixture was then refluxed for 1 hour, cooled to room temperature, and filtered as necessary.

Example 5

X90-1072-38-22

102 g of Formula No. 2 (20% IBMA/20% MMA/50% HEMA/10% BA), 200 g of reagent alcohol and two drops of concentrated $H_2SO_4$ were charged into a 1000 mL, four-neck round bottom flask equipped with overhead mechanical stirrer, condenser, additional funnel, claisen take-off adapter and temperature probes to measure temperature of the pot and head space. The pot contents were heated to 30-70 degrees Celsius until the mixture was completely solubilized. TEOS/Octyltriethoxysilane mixture (396 g of TEOS and 28 g of octyltriethoxysilane) was added. The pot contents were then heated to 65° C.+/−5° C. and 64 g of $H_2O$ containing two drops of concentrated $H_2SO_4$ was added drop wise over a 1-2 hour period. The mixture was then refluxed for 1 hour, cooled to room temperature, and filtered as necessary.

Example 6

X90-1072-42-23

164 g of Formula No. 2 (20% IBMA/20% MMA/50% HEMA/10% BA), 200 g of reagent alcohol and two drops of concentrated $H_2SO_4$ were charged into a 1000 mL, four-neck round bottom flask equipped with overhead mechanical stirrer, condenser, additional funnel, claisen take-off adapter and temperature probes to measure temperature of the pot and head space. The pot contents were heated to 30-70 degrees Celsius until the mixture was completely solubilized. TEOS/Octyltriethoxysilane mixture (396 g of TEOS and 28 g of octyltriethoxysilane) was added. The pot contents were then heated to 65° C.+/−5° C. and 64 g of $H_2O$ containing two drops of concentrated $H_2SO_4$ was added drop wise over a 1-2 hour period. The mixture was then refluxed for 1 hour, cooled to room temperature, and filtered as necessary.

Example 7

X90-1072-43-24

164 g of Formula No. 2 (20% IBMA/20% MMA/50% HEMA/10% BA), 200 g of reagent alcohol and five drops of concentrated $H_2SO_4$ were charged into a 1000 mL, four-neck round bottom flask equipped with overhead mechanical stirrer, condenser, additional funnel, claisen take-off adapter and temperature probes to measure temperature of the pot and head space. The pot contents were heated to 30-70 degrees Celsius until the mixture was completely solubilized. TEOS/Octyltriethoxysilane mixture (396 g of TEOS and 28 g of octyltriethoxysilane) was added. The pot contents were then heated to 65° C.+/−5° C. and 64 g of $H_2O$ was added drop wise over a 1-2 hour period. The mixture was then refluxed for 1 hour, cooled to room temperature, and filtered as necessary.

Example 8

X90-1072-51-25

180 g of Formula No. 1 (35% MMA/35% IBMA/30% HEMA), 200 g of reagent alcohol and two drops of concentrated $H_2SO_4$ were charged into a 1000 mL, four-neck round bottom flask equipped with overhead mechanical stirrer, condenser, additional funnel, claisen take-off adapter and temperature probes to measure temperature of the pot and head space. The pot contents were heated to 30-70 degrees Celsius until the mixture was completely solubilized. 417 g of TEOS/Octyltriethoxysilane mixture (396 g of TEOS and 28 g of octyltriethoxysilane) was added. The pot contents were then heated to 65° C.+/−5° C. and 65 g of $H_2O$ containing two drops of concentrated $H_2SO_4$ was added drop wise over a 1-2 hour period. The mixture was then refluxed for 1 hour, cooled to room temperature, and filtered as necessary.

Example 9

X90-1067-99-11

180 g of Formula No. 1 (35% MMA/35% IBMA/30% HEMA), 200 g of ethanol and two drops of concentrated $H_2SO_4$ were charged into a 1000 mL, four-neck round bottom flask equipped with overhead mechanical stirrer, condenser, additional funnel, claisen take-off adapter and temperature probes to measure temperature of the pot and head space. The pot contents were heated to 70 degrees Celsius or until the mixture was completely solubilized. 417 g of TEOS was added slowly so the pot temperature was not below 50° C. The pot contents were then heated to 65° C.+/−5° C. and 65 g of $H_2O$ containing two drops of concentrated $H_2SO_4$ was added drop wise over a 0.5-2 hour period. The mixture was then refluxed for 1 hour, cooled to room temperature, and filtered as necessary.

Example 10

X90-1067-55-7

180 g of Formula No. 1 (35% MMA/35% IBMA/30% HEMA), 833 g of TEOS, 411 g of ethanol and three drops of concentrated $H_2SO_4$ were charged into a 2000 mL, four-neck round bottom flask equipped with overhead mechanical stirrer, condenser, additional funnel, claisen take-off adapter and temperature probes to measure temperature of the pot and head space. The pot contents were then heated to 65° C.+/−5° C. and 130 g of $H_2O$ containing three drops of concentrated $H_2SO_4$ was added drop wise over a 0.5-2 hour period. The mixture was then refluxed for 1 hour, cooled to room temperature, and filtered as necessary. 50 mL of the material obtained above, 50 g isopropyl alcohol and 5 g tetraisopropyl titanate were added into a 250 mL glass bottle to form a solution. The solution was then drawn down on an aluminum plate and cured at ambient to form coatings.

Example 11

X90-1078-2-39 (25% Acrylic with 10% OTEOS)

100 g of Formula No. 3 (34% MMA/46% BA/30% HEMA), 150 g of reagent alcohol and two drops of concentrated $H_2SO_4$ were charged into a 1000 mL, four-neck round bottom flask equipped with overhead mechanical stirrer, condenser, additional funnel, claisen take-off adapter and temperature probes to measure temperature of the pot and head space. The pot contents were heated to about 30-70 degrees Celsius until the mixture was completely solubilized. TEOS/OTEOS(Octyltriethoxysilane) mixture (375 g of TEOS and 55.3 g of OTEOS) was added. The pot contents were then heated to 65° C.+/−5° C. and 63 g of $H_2O$ containing two drops of concentrated $H_2SO_4$ for 90% theoretical hydrolysis was added drop wise over a 1-2 hour period. The mixture was then refluxed for 1 hour, cooled to room temperature, and filtered as necessary.

Example 12

X90-1078-3-40 (25% Acrylic with 10% OTEOS)

97.7 g of Formula No. 4 (10% MMA/27% MA/30% HEMA/33% BA), 153 g of reagent alcohol and two drops of concentrated $H_2SO_4$ were charged into a 1000 mL, four-neck round bottom flask equipped with overhead mechanical stirrer, condenser, additional funnel, claisen take-off adapter and temperature probes to measure temperature of the pot and head space. The pot contents were heated to about 30-70 degrees Celsius until the mixture was completely solubilized. TEOS/OTEOS(Octyltriethoxysilane) mixture (380 g of TEOS and 55.3 g of OTEOS) was added. The pot contents were then heated to 65° C.+/−5° C. and 63 g of $H_2O$ containing two drops of concentrated $H_2SO_4$ for 90% theoretical hydrolysis was added drop wise over a 1-2 hour period. The mixture was then refluxed for 1 hour, cooled to room temperature, and filtered as necessary.

Example 13

X90-1078-6-41 (45% Acrylic with 20% OTEOS)

40.9 g of Formula No. 3 (34% MMA/46% BA/30% HEMA), 25 g of reagent alcohol and one drop of concentrated $H_2SO_4$ were charged into a 250 mL, one-neck round bottom flask equipped with magnetic stirrer, hot plate, two claisen adapters and temperature probes to measure temperature of the pot. The pot contents were heated to about 30-70 degrees Celsius until the mixture was completely solubilized. TEOS/OTEOS(Octyltriethoxysilane) mixture (55.5 g of TEOS and 18.4 g of OTEOS) was added. The pot contents were then heated to 65° C.+/−5° C. and 10.2 g of $H_2O$ for 90% theoretical hydrolysis was added drop wise over a 0.5-2 hour period. The mixture was then refluxed for 1 hour, cooled to room temperature, and filtered as necessary.

Example 14

X90-1078-7-42 (45% Acrylic with 20% OTEOS)

40.9 g of Formula No. 4 (10% MMA/27% MA/30% HEMA/33% BA), 25 g of reagent alcohol and one drop of concentrated $H_2SO_4$ were charged into a 250 mL, one-neck round bottom flask equipped with magnetic stirrer, hot plate, two claisen adapters and temperature probes to measure temperature of the pot. The pot contents were heated to about 30-70 degrees Celsius until the mixture was completely solubilized. TEOS/OTEOS(Octyltriethoxysilane) mixture (55.5 g of TEOS and 18.4 g of OTEOS) was added. The pot contents were then heated to 65° C.+/−5° C. and 10.3 g of $H_2O$ for 90% theoretical hydrolysis was added drop wise over a 0.5-2 hour period. The mixture was then refluxed for 1 hour, cooled to room temperature, and filtered as necessary.

Example 15

X90-1078-10-43 (45% Acrylic with 20% OTEOS and Stripped)

41.6 g of Formula No. 2 (20% MMA/20% IBMA/50% HEMA/10% BA), 33.3 g of reagent alcohol and one drop of concentrated $H_2SO_4$ were charged into a 250 mL, one-neck round bottom flask equipped with magnetic stirrer, hot plate, two claisen adapters and temperature probes to measure temperature of the pot and head space. The pot contents were heated to about 30-70 degrees Celsius until the mixture was completely solubilized. TEOS/OTEOS(Octyltriethoxysilane) mixture (52.1 g of TEOS and 23 g of OTEOS) was added. The pot contents were then heated to 65° C.+/−5° C. and 10.1 g of $H_2O$ for 90% theoretical hydrolysis was added drop wise over a 0.5-2 hour period. The mixture was then refluxed for 1 hour, concentrated to remove the majority of ethanol and reconstituted in acetone. The product was then cooled to room temperature, and filtered as necessary.

Example 16

X90-1078-20-45 (45% Acrylic with 5% OTEOS/20% IBTMOS)

45.6 g of Formula No. 1 (35% IBMA/35% MMA/20% HEMA), 25 g of reagent alcohol and one drop of concentrated $H_2SO_4$ were charged into a 250 mL, one-neck round bottom flask equipped with magnetic stirrer, hot plate, two claisen adapters and temperature probes to measure temperature of the pot. The pot contents were heated to about 30-70 degrees Celsius until the mixture was completely solubilized. TEOS/OTEOS (Octyltriethoxysilane)/IBTMOS (Isobutyltrimethoxysilane) mixture (52.1 g of TEOS, 4.61 g of OTEOS and 11.9 g of IBTMO) was added. The pot contents were then heated to 65° C.+/−5° C. and 10.1 g of $H_2O$ for 90% theoretical hydrolysis was added drop wise over a 0.5-2 hour period. The mixture was then refluxed for 1 hour, cooled to room temperature, and filtered as necessary.

Example 17

X90-1078-20-46 (45% Acrylic with 25% IBTMOS)

45.6 g of Formula No. 1 (35% IBMA/35% MMA/20% HEMA), 25 g of reagent alcohol and one drop of concentrated $H_2SO_4$ were charged into a 250 mL, one-neck round bottom flask equipped with magnetic stirrer, hot plate, two claisen adapters and temperature probes to measure temperature of the pot. The pot contents were heated to about 30-70 degrees Celsius until the mixture was completely solubilized. TEOS/IBTMOS (Isobutyltrimethoxysilane) mixture (53.2 g of TEOS and 14.8 g of IBTMOS) was added. The pot contents were then heated to 65° C.+/−5° C. and 10.1 g of $H_2O$ for 90% theoretical hydrolysis was added drop wise over a 0.5-2 hour period. The mixture was then refluxed for 1 hour, cooled to room temperature, and filtered as necessary.

Example 18

X90-1072-64-27 (35% Acrylic with 5% OTEOS/5% IBTMOS)

30 g of Formula No. 1 (35% IBMA/35% MMA/20% HEMA), 36 g of reagent alcohol and one drop of concentrated $H_2SO_4$ were charged into a 250 mL, one-neck round bottom flask equipped with magnetic stirrer, hot plate, two claisen adapters and temperature probes to measure temperature of the pot. The pot contents were heated to about 30-70 degrees Celsius until the mixture was completely solubilized. TEOS/OTEOS(Octyltriethoxysilane)/(IBTMOS (Isobutyltrimethoxysilane) mixture (62.5 g of TEOS, 4.61 g of OTEOS and 3.0 g of IBTMOS) was added. The pot contents were then heated to 65° C.+/−5° C. and 10.5 g of $H_2O$ for 90% theoretical hydrolysis was added drop wise over a 0.5-2 hour period. The mixture was then refluxed for 1 hour, cooled to room temperature, and filtered as necessary.

Example 19

X90-1072-73-32 (45% Acrylic Resin with 25% OTEOS)

41.6 g of Formula No. 2 (20% MMA/20% IBMA/50% HEMA/10% BA), 33.5 g of reagent alcohol and one drop of concentrated $H_2SO_4$ were charged into a 250 mL, one-neck round bottom flask equipped with magnetic stirrer, hot plate, two claisen adapters and temperature probes to measure temperature of the pot. The pot contents were heated to about 30-70 degrees Celsius until the mixture was completely solubilized. TEOS/OTEOS(Octyltriethoxysilane) mixture (52.1 g of TEOS and 23.0 g of OTEOS) was added. The pot contents were then heated to 65° C.+/−5° C. and 10.1 g of $H_2O$ for 90% theoretical hydrolysis was added drop wise over a 0.5-2 hour period. The mixture was then refluxed for 1 hour, cooled to room temperature, and filtered as necessary.

Example 20

Clear Coatings and Evaluations Using X90-1072-73-32

Clear coatings were prepared using X90-1072-73-32 obtained from Example 19 with or without a coating curing agent as shown in Table 1. The coating curing agent used in the Example included 10% Dibutyltin dilaurate (DBTDL) in isopropyl alcohol (IPA), 10% tetraisopropyl titinate (TIPT) in IPA and 8% Zinc-Hex that was obtained from Air Products serving as source of zinc octoate.

TABLE 1

Coating Mixture

| Sample | X90-1072-73-32, g | Curing Agents |
| --- | --- | --- |
| Control | 10 | None |
| F-1072-91-DBTDL | 10 | 1 drop of 10% DBTDL |
| F-1072-91-TIPT | 10 | 1 drop of 10% TIPT |
| F-1072-91-ZincHex | 10 | 1 drop of 8% ZincHex |

Each coating mixture in Table 1 was drawn down 5 mils over a Zinsser BIN primed drywall. The coating was cured at ambient conditions and heat aged at temperature of about 60° C. and about 50% relative humidity for about 44 to about 48 hours.

The coatings thus obtained were graded and evaluated by the grading and evaluation methods described below. The results obtained are given in Table 2.

Grading and Evaluation Methods for Coatings (1) Dry-Erase: As a testing protocol, a scale of 0-5 was used to quantify the removal of the dry-erase markers' ink from each cured coating. The coating surface thereof was evaluated by the eye according to the following criteria:
  0: Like paper, ink is essentially not removed;
  1: Some ink is removed with wiping but color is still solid and dark;
  2: Most ink is removed with wiping but color is still readily visible;
  3: Almost all ink is removed but ghosting remains;
  4: After wiping faint ghosting remains or ink can be completely removed but an unacceptable amount of rubbing is necessary;
  5: Like glass, ink is completely removed with one or two passes.

(2) Cracking: A scale of A-E was used to quantify the coating surface's cracking by visual examination according to the following criteria:
  A: No cracking whatsoever;
  B: Fine visible cracks in coating and/or minor flaking at the edges;
  C: Readily visible cracks and/or significant flaking at the edges;
  D: The coating has broken into dust-sized particles but some adhesion remains;
  E: Complete failure of the coating, total flaking, practically no adhesion.

(3) Marker Abrasion Resistance: An EXPO® Original and EXPO® Low Odor (Sanford Corporation, Oakbrook, Ill.) marker was used to draw circles (about the size of a dime) repeatedly as hard as possible without completely ruining the marker in one spot for about 30 seconds on the surface of the cured coating. The marking material was dried for a few seconds and was wiped off using a paper towel. Marker abrasion resistance was qualitatively evaluated visually after wiping according to the following criteria:
  +: No significant change in coating gloss, no residual staining, and no removal of coating from substrate;
  0: Very slight reduction in coating gloss, no residual staining, and no removal of coating from substrate;
  −: Significant reduction in coating gloss, residual ink staining, and/or removal of coating from substrate.

TABLE 2

Coating Grading and Evaluation

| Sample | Dry-Erase | Cracking | Marker Abrasion Resistance |
| --- | --- | --- | --- |
| Control | 5 | A | + |
| F-1072-91-DBTDL | 5 | A | + |
| F-1072-91-TIPT | 5 | A | + |
| F-1072-91-ZincHex | 5 | A | + |

Example 21

Effect of Colloidal Silica Filler on Coatings Using X90-1072-59-26

Effect of colloidal silica filler in the properties of the final coatings were tested using the base composition X90-1072-59-26 obtained from Example 1. Two colloidal silica fillers—IPA ST and IPA ST-UP (Nissan Chemical) were used. IPA ST contains spherical particles with about 10-15 nm in diameter and has % solids of about 30-31 wt %. IPA ST-UP contains elongated particles with about 10-15 nm×40-100 nm and has % solids of about 15-16 wt %. These two colloidal silica fillers were both in isopropyl alcohol. Different weight percentages of these two particles were added into the base composition XP-1072-59-26 to form mixtures as shown in Tables 3 and 4. The mixtures were formed in 15×150 mm test tubes and shaken by hand. The mixtures were then applied using a 5 mil draw down bar over an aluminum plate and a Zinsser BIN primed drywall. The coatings were cured at ambient conditions and heat aged at temperature of about 60° C. and about 50% relative humidity for about 44 to about 48 hours. The coatings thus obtained were graded and evaluated by the grading and evaluation methods described in Example 20. The results obtained are given in Tables 5, 6, 7 and 8.

TABLE 3

Coating Mixture with IPA ST

| Sample | X90-1072-59-26, g | IPA ST, wt % |
|---|---|---|
| Control | 10 | 0 |
| FX-1072-59-26-ST-1 | 10 | 0.1 |
| FX-1072-59-26-ST-2 | 10 | 0.25 |
| FX-1072-59-26-ST-3 | 10 | 0.5 |
| FX-1072-59-26-ST-4 | 10 | 1 |
| FX-1072-59-26-ST-5 | 10 | 2 |

TABLE 4

Coating Mixture with IPA ST-UP

| Sample | X90-1072-59-26, g | IPA ST-UP, wt % |
|---|---|---|
| Control | 10 | 0 |
| FX-1072-59-26-STUP-1 | 10 | 0.1 |
| FX-1072-59-26-STUP-2 | 10 | 0.25 |
| FX-1072-59-26-STUP-3 | 10 | 0.5 |
| FX-1072-59-26-STUP-4 | 10 | 1 |
| FX-1072-59-26-STUP-5 | 10 | 2 |

TABLE 5

Coating Evaluation Containing IPA ST for Drywall

| Sample | Dry-Erase | Cracking | Marker Abrasion Resistance |
|---|---|---|---|
| Control | 4 | A | + |
| FX-1072-59-26-ST-1 | 5 | A | + |
| FX-1072-59-26-ST-2 | 4 | A | + |
| FX-1072-59-26-ST-3 | 5 | A | + |
| FX-1072-59-26-ST-4 | 5 | A | + |
| FX-1072-59-26-ST-5 | 5 | A | + |

TABLE 6

Coating Evaluation Containing IPA ST for Aluminum Plate

| Sample | Dry-Erase | Cracking | Marker Abrasion Resistance |
|---|---|---|---|
| Control | 5 | B | + |
| FX-1072-59-26-ST-1 | 5 | B | + |
| FX-1072-59-26-ST-2 | 5 | A | + |
| FX-1072-59-26-ST-3 | 5 | A | + |
| FX-1072-59-26-ST-4 | 5 | B | + |
| FX-1072-59-26-ST-5 | 5 | A | + |

TABLE 7

Coating Evaluation Containing IPA ST-UP for Drywall

| Sample | Dry-Erase | Cracking | Marker Abrasion Resistance |
|---|---|---|---|
| Control | 4 | A | + |
| FX-1072-59-26-STUP-1 | 5 | A | + |
| FX-1072-59-26-STUP-2 | 5 | A | + |
| FX-1072-59-26-STUP-3 | 5 | A | + |
| FX-1072-59-26-STUP-4 | 5 | A | + |
| FX-1072-59-26-STUP-5 | 5 | A | + |

TABLE 8

Coating Evaluation Containing IPA ST-UP for Aluminum Plate

| Sample | Dry-Erase | Cracking | Marker Abrasion Resistance |
|---|---|---|---|
| Control | 5 | B | + |
| FX-1072-59-26-STUP-1 | 5 | B | + |
| FX-1072-59-26-STUP-2 | 5 | A | + |
| FX-1072-59-26-STUP-3 | 5 | A | + |
| FX-1072-59-26-STUP-4 | 5 | B | + |
| FX-1072-59-26-STUP-5 | 5 | B | + |

Example 22

X90-1072-97-38

Charged JREZ 84-13 (10% MMA/27% MA/30% HEMA/33% BA), reagent alcohol, and 2 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/OTEOS (Octyltriethoxysilane) mixture at the highest rate that did not induce point of contact incompatibility or incompatibility due to lowered temperature. The pot contents were then heated to 65 C+/−5 C and enough H2O (containing two drops of concentrated H2SO4) for 90% theoretical hydrolysis was added drop wise over a 1-2 hour period. The mixture was refluxed for 1 hour, cooled to room temperature, and filtered. Underperformed (Readily visible cracks and flaking around the edges).

Example 23

X90-1084-83-70

Charged acrylic 1088-3-A (37% Styrene, 13% 2-Ethyl-Hexyl Acrylate, and 50% HEMA), reagent alcohol, and 3 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Octyl-trimethoxysilane (OTMOS) mixture at the highest rate that did not induce point of contact incompatibility or incompatibility due to lowered temperature. The pot contents were then heated to 65 C+/−5 C and enough H2O (containing 3 drops of concentrated H2SO4) for 90% theoretical hydrolysis was added drop wise over a 1-2 hour period. The mixture was refluxed for 1 hour, cooled to room temperature, and filtered. Underperformed (discolored coating, marker pitted coating, wax flakes observed).

Example 24

X90-1084-86-71

Charged JREZ 84-11 (20% IBMA/20% MMA/50% HEMA/10% BA), reagent alcohol, and 2 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Octyltrimethoxysilane (OTMOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis was added drop wise over a 1-2 hour period. The mixture was refluxed for 1 hour, cooled to room temperature, and filtered. Underperformed slightly (slight carry-over of marker especially during grind testing).

Example 25

X90-1084-81-69

Charged JREZ 84-11 (20% IBMA/20% MMA/50% HEMA/10% BA), reagent alcohol, and 2 drops of concentrated H2SO4 to a 1000 ml, 4 neck round bottom flask equipped with overhead mechanical stirrer, condenser, addition funnel, glass bead packed column, Claisen take-off adapter, and temperature probes to measure temperature of the pot and head space. Heated the pot contents to 30-70 degrees Celsius until the mixture was completely solubilized. Added TEOS/Octyltrimethoxysilane (OTMOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis were added drop wise over a 1-2 hour period. The mixture was refluxed for 1 hour. After reflux, the material in the pot was stripped. Tertiary butyl acetate was added to the pot to replace the material removed. After as much ethanol as possible was removed, the contents were cooled to room temperature and bottled. Underperformed (during marker grind).

Example 26

1084-67-67

Charged F-1084-61-3 Acrylic (30% 2-Hydroxyethyl Methacrylate, 30% 2-Hydroxyethyl Acrylate, 30% Methyl Methacrylate, 10% Tert-Butyl Acrylate), reagent alcohol, and 4 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Octyltrimethoxysilane (OTMOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis were added drop wise over a 1-2 hour period. The mixture was refluxed for 1 hour, cooled to room temperature, and filtered. Underperformed (Residual Marker Color, Grind Test Defect, Lost gloss).

Example 27

1084-66-66

Charged F-1084-59-2 Acrylic (50% 2-Hydroxyethyl methacrylate, 40% Methyl Methacrylate, 10% Tert-Butyl Acrylate), reagent alcohol, and 4 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Octyltrimethoxysilane (OTMOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis were added drop wise over a 1-2 hour period. The mixture was refluxed for 1 hour, cooled to room temperature, and filtered. Underperformed (Swipe Test Left Marker, Grind Test Deformed coating, Slight cracking after 15 days in oven).

Example 28

1084-64-65

Charged F-1084-61-3 Acrylic (30% 2-Hydroxyethyl Methacrylate, 30% 2-Hydroxyethyl Acrylate, 30% Methyl Methacrylate, 10% Tert-Butyl Acrylate), reagent alcohol, and 4 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Isobutyltrimethoxysilane (IBTMOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis were added drop wise over a 1-2 hour period. The mixture was refluxed for 1 hour, cooled to room temperature, and filtered. Underperformed (Grind test pitted surface of some substrates, but not all; Performed well until 30 days when it cracked).

Example 29

1084-63-64

Charged F-1084-59-2 Acrylic (50% 2-Hydroxyethyl methacrylate, 40% Methyl Methacrylate, 10% Tert-Butyl Acrylate), reagent alcohol, and 4 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Isobutyltrimethoxysilane (IBTMOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis was added drop wise over a 1-2 hour period. The mixture was refluxed for 1 hour, cooled to room temperature, and filtered. Underperformed (cracked after 5 days of cure).

Example 30

1084-55-63

Charged F-1084-51-1 Acrylic (50% 2-Hydroxyethyl Acrylate, 40% Methyl Methacrylate, 10% Tert-Butyl Acrylate), reagent alcohol, and 4 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Isobutyltrimethoxysilane (IBTMOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis was added drop wise over a 1-2 hour period. The mixture was refluxed for 1 hour, cooled to room temperature, and filtered. Underperformed (Cracked; Grind Test Failures).

Example 31

1084-54-62

Charged JREZ 84-11 (20% IBMA/20% MMA/50% HEMA/10% BA), reagent alcohol, and 2 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Isobutyltrimethoxysilane (IBTMOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis were added drop wise over a 1-2 hour period. The mixture was refluxed for 1 hour, cooled to room temperature, and filtered. Underperformed (Failed Light Erase Test; Marker absorbed into coating on grind test).

Example 32

1084-46-61

Charged JREZ 84-11 (20% IBMA/20% MMA/50% HEMA/10% BA), reagent alcohol, and 2 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Isobutyltrimethoxysilane (IBTMOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis was added drop wise over a 1-2 hour period. The mixture was refluxed for 1 hour, cooled to room temperature, and filtered. Slightly Underperformed (Very Slight cracking; Often passed swipe and grind tests with minimal marker residue).

Example 33

1084-34-58

Charged JREZ 84-11 (20% IBMA/20% MMA/50% HEMA/10% BA), reagent alcohol, and 2 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Isobutyltrimethoxysilane (IBTMOS)/Octyltriethoxysilane (OTEOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis were added drop wise over a 1-2 hour period. The mixture was refluxed for 1 hour, cooled to room temperature, and filtered. Good Performance (slight cracking observed on some substrates).

Example 34

1084-33-57

Charged JREZ 84-11 (20% IBMA/20% MMA/50% HEMA/10% BA), reagent alcohol, and 2 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Isobutyltrimethoxysilane (IBTMOS)/Isobutyltriethoxysilane (IBTEOS) mixture at the highest rate that did not induce point of contact incompatibility or incompatibility due to lowered temperature. The pot contents were then heated to 65 C+/−5 C and enough H2O (containing 2 drops of concentrated H2SO4) for 90% theoretical hydrolysis was added drop wise over a 1-2 hour period. The mixture was refluxed for 1 hour, cooled to room temperature, and filtered. Underperformed (cracking on all substrates, passed some of the swipe and grind tests).

Example 35

1084-6-53

Charged JREZ 84-11 (20% IBMA/20% MMA/50% HEMA/10% BA), reagent alcohol, and 10 drops of concentrated H2SO4 to a 1000 ml, 4 neck round bottom flask equipped with overhead mechanical stirrer, condenser, addition funnel, Claisen take-off adapter, and temperature probes to measure temperature of the pot and head space. Heated the pot contents to 30-70 degrees Celsius until the mixture was completely solubilized. Added TEOS/Isobutyltrimethoxysilane (IBTMOS) mixture at the highest rate that did not induce point of contact incompatibility or incompatibility due to lowered temperature. The pot contents were then heated to 65

C+/−5 C and enough H2O (containing 9 drops of concentrated H2SO4) for 90% theoretical hydrolysis were added drop wise over a 1-2 hour period. The mixture was refluxed for 1 hour, cooled to room temperature, and filtered. Outperformed when tested on aluminum substrates (performed good).

What is claimed is:

1. A coating product comprising a cured clear acrylic coating extending upon a substrate and having a surface, wherein the coating is formed from a base composition in a carrier, optionally with a coating curing agent, wherein the base composition is produced by reacting a hydroxyl-containing acrylic resin, an alcohol, a silane compound, water, and an acid catalyst, wherein the silane compound is present at a range of from about 33 wt % to about 58 wt % of the base composition.

2. The coating product of claim 1, wherein the hydroxyl-containing acrylic resin is produced by copolymerizing a hydroxyl-containing acrylic monomer with another ethylenically unsaturated group-containing monomer.

3. The coating product of claim 1, wherein the alcohol is selected from the group consisting of methanol, ethanol, 2-propanol, butanol, isobutanol and combinations thereof.

4. The coating product of claim 1, wherein the silane compound has a general chemical formula: $R_n Si(OR')_{4-n}$, wherein each R and R' independently represent a hydrocarbon group, and n is $0 \leq n < 4$.

5. The coating product of claim 1, wherein the acid catalyst is selected from the group consisting of hydrochloric acid, sulfuric acid, nitric acid, phosphoric acid and combinations thereof.

6. The coating product of claim 1, wherein the alcohol is removed from the base composition and wherein the silane compound is present at a range of from about 55 wt % to about 73 wt % of the base composition absent the alcohol.

* * * * *